(12) United States Patent
Giannetti et al.

(10) Patent No.: US 9,458,307 B2
(45) Date of Patent: Oct. 4, 2016

(54) CURABLE COMPOSITION

(75) Inventors: Enzo Giannetti, Novara (IT); Aldo Sanguineti, Milan (IT); Ivan Wlassics, Garessio (IT); Giuseppe Marchionni, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 521 days.

(21) Appl. No.: 13/517,239

(22) PCT Filed: Dec. 16, 2010

(86) PCT No.: PCT/EP2010/069846
§ 371 (c)(1),
(2), (4) Date: Jun. 19, 2012

(87) PCT Pub. No.: WO2011/076652
PCT Pub. Date: Jun. 30, 2011

(65) Prior Publication Data
US 2012/0264887 A1 Oct. 18, 2012

(30) Foreign Application Priority Data
Dec. 23, 2009 (EP) .................................. 09180544

(51) Int. Cl.
*C08K 5/02* (2006.01)
*C08K 5/01* (2006.01)
(Continued)

(52) U.S. Cl.
CPC ............... *C08K 5/01* (2013.01); *C08K 5/0025* (2013.01); *C08K 5/02* (2013.01); *C08K 5/5475* (2013.01)

(58) Field of Classification Search
CPC ..... C08K 5/0025; C08K 5/5475; C08K 5/02
See application file for complete search history.

(56) References Cited

U.S. PATENT DOCUMENTS

| 5,567,800 A | 10/1996 | Hergenrother et al. |
| 6,121,495 A | 9/2000 | Babb et al. |
| 2002/0099158 A1 * | 7/2002 | Godschalx et al. .......... 526/285 |

(Continued)

FOREIGN PATENT DOCUMENTS

| EP | 2199329 A1 * | 6/2010 | ............ C08F 8/00 |
| JP | S61-195157 A | 8/1986 | |

(Continued)

OTHER PUBLICATIONS

Morgan et al. Macromolecules 1998, 2857-2865.*
Hickenboth, Charles R.—et al—"Preparation of enediyne-cross-linked networks and their reactivity under thermal and mechanical conditions", 2008, Tetrahedron 64, Elsevier Ltd., pp. 8435-8448; 14 pgs.

(Continued)

*Primary Examiner* — Mark Kaucher

(57) ABSTRACT

The invention relates to the use of 1,5-enediyne compounds of formula (I) as curing agents in polymeric systems. In particular the invention relates to a curable composition comprising a curing agent of formula (I) and a polymer suitable to be cross-linked and to the cured article obtained therefrom.

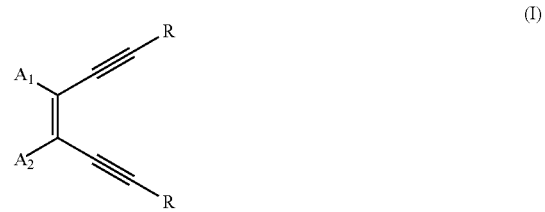

(I)

20 Claims, 1 Drawing Sheet

(51) Int. Cl.
*C08K 5/00* (2006.01)
*C08K 5/5475* (2006.01)

(56) References Cited

U.S. PATENT DOCUMENTS

| | | | |
|---|---|---|---|
| 2004/0044121 A1 | 3/2004 | Kadlec et al. | |
| 2005/0230025 A1* | 10/2005 | Bates et al. | 156/73.4 |
| 2007/0120120 A1 | 5/2007 | Jeong et al. | |
| 2008/0116452 A1 | 5/2008 | Jeong et al. | |
| 2011/0315424 A1* | 12/2011 | Nilsson et al. | 174/110 PM |
| 2014/0323661 A1* | 10/2014 | Avataneo et al. | 525/276 |

FOREIGN PATENT DOCUMENTS

| | | |
|---|---|---|
| JP | 2002-020623 A | 1/2002 |
| JP | 2008-056615 A | 3/2008 |
| WO | 01/59011 A1 | 8/2001 |

OTHER PUBLICATIONS

Warner, Benjamin P.—et al—"Controlled Acceleration and Inhibition of Bergman Cyclization by Metal Chlorides", Science, 1995, vol. 269 (5225), pp. 814-816; 3 pgs.

Smith, Dennis W., Jr.—et al—"Polynaphthalene Networks from Bisphenols", Journal of American Chemical Society, 1998, 120, pp. 9078-9079—ACS; 2 pgs.

Basak, Amit, et al—"Chelation-Controlled Bergman Cyclization: Synthesis and Reactivity of Enediynyl Ligands", Chemical Reviews, 2003, 103, No. 10, pp. 4077-4094; 18 pgs.

Perpall, Mark W.—et al—"Enediyne derived polyarylenes for potential use as proton exchange membranes", Abstracts of Papers, 231st ACS National Meeting, Atlanta, GA, United States, Mar. 26-30, 2006, POLY-203 Publisher: American Chemical Society, Washington, D. C.; 1 pg.

Smith, Dennis W., Jr.—et al—"Polyarylene Networks via Bergman Cyclopolymerization of Bis-*ortho*-diynyl Arenes", Advanced Functional Materials, 2007, 17(8), pp. 1-10; 10 pgs.

* cited by examiner

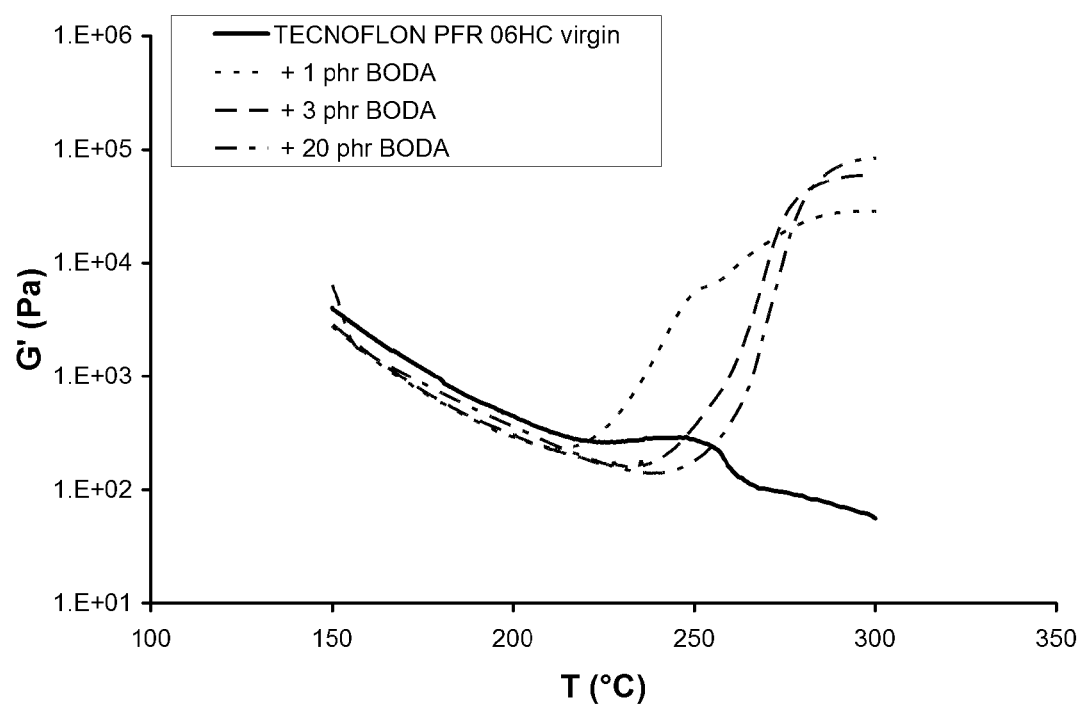

CURABLE COMPOSITION

This application is a U.S. national stage entry under 35 U.S.C. §371 of International Application No. PCT/EP2010/069846 filed Dec. 16, 2010, which claims priority to European application No. 09180544.0 filed on Dec. 23, 2009, the whole content of which being incorporated herein by reference for all purposes.

TECHNICAL FIELD

The invention relates to the use of 1,5-enediyne compounds as curing agents in polymeric systems. In particular the invention relates to a curable composition comprising a 1,5-enediyne curing agent and a polymer suitable to be cross-linked and to the cured article obtained therefrom.

BACKGROUND ART

The cross-linking, or curing, of polymers has been known for many years. Cross-linking, or curing, creates a three-dimensional structure covalently bridging the polymer chains that in general provides strength and stability to the polymer. The cross-linking of polymer systems is typically carried out by means of radiation (e.g. electron beam radiation) or by addition of suitable curing agents, e.g. the addition of sulphur in the vulcanization of rubber.

It has now been found that compounds comprising at least one 1,5-enediyne moiety can be used as curing agents in polymeric systems.

Compounds comprising a 1,5-enediyne moiety have been described as monomers for the preparation of highly conjugated polymeric networks for use in electronic applications. For instance US 2008/0116452 and US 2007/0120120 both disclose semiconductor thin films obtained by homopolymerizing aromatic enediynes derivatives.

Similarly, U.S. Pat. No. 6,121,495 discloses coatings and laminates comprising at least one layer obtained from polymers derived from the polymerization of ethynyl-substituted aromatic compounds of formula $(R-C{\equiv}C)_n Ar-L-[Ar(C{\equiv}C-R)_m]_q$ wherein each Ar is an aromatic group; each R is independently an alkyl, aryl; L is a covalent bond or group that links one Ar group to at least one other Ar group; n and m are integers of at least 2; and q is an integer of at least 1.

C. R. Hickenboth, J. D. Rule, J. S. Moore, Tetrahedron, 64 (2008), 8435-8448 discloses copolymers comprising recurring units derived from methyl methacrylate and monomers comprising a 1,5-enediyne moiety having methyl methacrylate functional groups. The 1,5-enediyne moiety is incorporated into the poly(methyl methacrylate)polymeric chain by means of the methyl methacrylate functionality. The copolymer comprising the 1,5-enediyne moieties is used as a radical initiator to promote the polymerization of additional methyl methacrylate monomeric units providing a cross-linked polymeric network. No disclosure is made of a composition comprising a polymer on one side and a compound comprising a 1,5-enediyne moiety on the other side.

None of the prior art documents discloses the use of 1,5-enediyne compounds as curing agents in polymeric systems.

SUMMARY OF INVENTION

Accordingly, the invention relates to the use of compounds comprising at least one 1,5-enediyne moiety as curing agents in polymeric systems.

In a first aspect the invention relates to a curable composition comprising:
(a) at least one polymer (P); and
(b) at least one curing agent of formula (I):

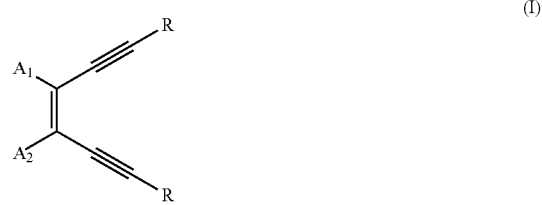

wherein each R in formula (I), equal to or different from each other, is independently selected from the group consisting of hydrogen; halogen (e.g. F, Cl, Br, I); $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; $-SiR^1_3$, $-(R^1_2SiO)_b R^1$, $-PR^1_2$ wherein each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1.

In formula (I) $A_1$ and $A_2$, equal to or different from each other, are each independently selected from the group consisting of hydrogen; halogen (e.g. F, Cl, Br, I); $C_1$-$C_{20}$ alkyl, preferably $C_1$-$C_{10}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; $-(R^1_2SiO)_b R^1$ wherein $R^1$ and b are as defined above; aromatic or heteroaromatic radical, monocyclic or polycyclic, optionally substituted and/or optionally fluorinated; and wherein $A_1$ and $A_2$ may be comprised in an alkyl or aromatic cyclic structure, optionally substituted and/or optionally fluorinated.

In an embodiment of the invention the curing agent is selected from the compounds of formula (II):

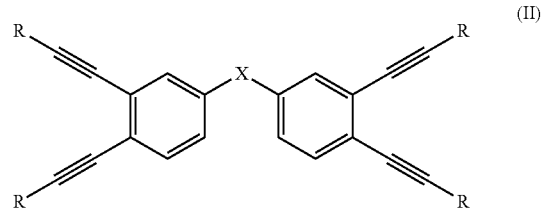

wherein each R, equal to or different from each other, is as above defined and X is a divalent bridging group selected from a carbon-carbon bond; a $C_1$-$C_{20}$ alkylene radical, optionally substituted (e.g. $-C(CH_3)_2-$) and/or optionally fluorinated (e.g. $-(CF_2)_n-$, $-C(CF_3)_2-$); a divalent (per)fluoropolyether radical; an organopolysiloxane radical $-(R^1_2SiO)_b-$ wherein $R^1$ and b are as defined above; a —O— radical; a —S— radical; a —SO$_2$— radical; a —C(O)— radical; a fused aromatic or heteroaromatic structure optionally substituted and/or optionally fluorinated.

The ethynyl groups on adjacent carbon atoms in formulas (I) and (II) are known to dimerize upon application of heat to form an aromatic ring having a 1,4-diradical. While not being bound by theory, it is believed that the 1,4-diradical may promote the cross-linking or curing process via a Bergman cyclization reaction such as the one disclosed by Warner et al. in Science, 268, (1995), pp. 814-816.

Polymer (P) is a polymer suitable to be cross-linked. Preferably polymer (P) is a polymer suitable to be cross-linked via a radical initiated mechanism. More preferably polymer (P) is a fluoropolymer. In a first embodiment polymer (P) is a fluoroelastomer. In a second embodiment polymer (P) is a semi-crystalline fluoropolymer.

In another aspect the invention relates to a process for preparing a curable composition comprising mixing:

(a) at least one polymer (P); and
(b) at least one curing agent of formula (I).

The curing agent may conveniently be selected from the compounds of formula (II) above.

In another aspect the invention relates to a process for curing the curable composition comprising heating the composition. Before the cross-linking or curing process no chemical bond exists between the curing agent of formula (I) or (II) and polymer (P), the formation of said chemical bonds being initiated by the 1,4-diradical generated by the ethynyl groups of the curing agent.

In a further aspect the invention relates to a process for making a cured article comprising: providing a composition of (a) at least one polymer (P); and of (b) at least one curing agent of formula (I), shaping the composition; curing the shaped composition to form an article; and optionally post curing the article.

The curing agent may conveniently be selected from the compounds of formula (II) above.

The Applicant has found that curing agents selected from the compounds of formula (I), including the ones of formula (II), are effective in the thermally initiated curing of polymeric materials without the need to use any additional initiator, accelerator or co-agent.

DEFINITIONS

The term "cross-link" is used herein to refer to a covalent chemical bond bridging one polymer chain to another.

The terms "cross-linking" or "curing" are used herein to refer to a process of chemically joining two or more polymer molecules by cross-links.

A "curing agent" is defined herein as a substance that, added to a polymer and/or polymer composition promotes cross-linking or curing.

BRIEF DESCRIPTION OF THE DRAWING

For a detailed description of preferred embodiments of the invention, reference will now be made to the accompanying drawing, in which:

FIG. 1 represents a storage modulus as a function of temperature.

DISCLOSURE OF INVENTION

It is thus an object of the present invention to provide a curable composition comprising:

(a) at least one polymer (P); and
(b) at least one curing agent of formula (I):

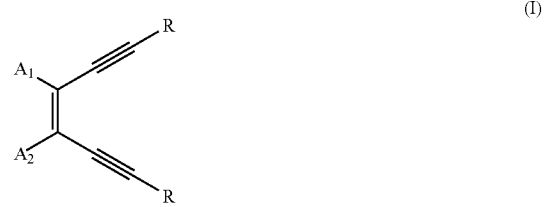

The phrase "at least one" when referred to the curing agent in the curable composition of the invention is used herein to indicate that one or more than one curing agent of each type can be present in the composition. Hereinafter the expression "curing agent" will be used to refer to both one or more than one curing agent.

Similarly, the phrase "at least one" when referred to the polymer (P) in the curable composition of the invention is used herein to indicate that one or more than one polymer (P) of each type can be present in the composition. Hereinafter the expression "polymer (P)" will be used to refer to both one or more than one polymer (P).

Each R in formula (I), equal to or different from each other, is independently selected from the group consisting of hydrogen; halogen (e.g. F, Cl, Br, I); $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; —SiR$^1_3$, —(R$^1_2$SiO)$_b$R$^1$, —PR$^1_2$ wherein each R$^1$, equal to or different from each other, is independently selected from the group consisting of hydrogen, $C_1$-$C_{20}$ alkyl, linear or branched, optionally substituted and/or optionally fluorinated and wherein b is an integer of at least 1. R groups may be comprised in a cyclic structure.

The nature of each R group, is not particularly critical to the invention; however, the size of the R groups may, due to steric hindrance, undesirably interfere with the dimerization reaction of the ethynyl groups. In general, any R group which does not prevent the formation of a 1,4-diradical from the reaction of the ethynyl groups upon thermal treatment can be used in the compounds of formula (I) or (II).

Each R group may be preferably selected from hydrogen; halogen (e.g. F, Cl, Br, I); $C_1$-$C_8$ alkyl, linear or branched, optionally substituted and/or optionally fluorinated, e.g. —CH$_3$, —C(CH$_3$)$_3$, —CF$_3$, —C$_2$F$_5$, —C$_3$F$_7$; $C_1$-$C_3$ oxyalkyl, linear or branched, optionally substituted and/or optionally fluorinated, e.g. —OCH$_3$, —OCF$_3$; (per)fluoropolyether chain; —(R$^1_2$SiO)$_b$R$^1$ wherein b and R$^1$ are as defined above; aromatic or heteroaromatic radical, monocyclic or polycyclic, optionally substituted and/or optionally fluorinated. Preferably R groups are not comprised in a cyclic structure.

When aromatic, each R group will have from 1 to 20 carbon atoms, more preferably from 6 to 15 carbon atoms, even more preferably from 6 to 10 carbon atoms. When aromatic, R is preferably an unsubstituted or substituted phenyl group, e.g. a phenyl substituted with one or more fluorine atoms or with a $C_1$-$C_6$ alkyl or oxyalkyl group optionally fluorinated, e.g. —$CH_3$, —$CF_3$, —$OCH_3$, —$OCF_3$. Even more preferably, when aromatic, R is an unsubstituted phenyl group.

Each R group may be a (per)fluoropolyether chain. Suitable (per)fluoropolyether chains may be represented by formula —$R_F$—$O_z$-T wherein: T is selected from a fluorine atom, a chlorine atom and a $C_1$-$C_3$ (per)fluoroalkyl group comprising, optionally, one or more hydrogen or chlorine atoms; z is equal to 0 or 1; and $R_F$ is a divalent (per)fluoropolyether radical selected from the following:

—$(CF_2CF_2O)_p(CF_2O)_q$—, wherein: p and q are integer numbers such that the q/p ratio is between 0.2 and 4, p being different from zero;

—$(CF_2CF(CF_3)O)_r$—$(CF_2CF_2O)_s$—$(CFX_0O)_t$—, wherein: $X_0$ is a fluorine atom or —$CF_3$; r and s are integer numbers such that t+s is between 1 and 50, the t/(r+s) ratio is between 0.01 and 0.05, (r+s) being different from zero;

—$(CF(CF_3)CF_2O)_u$—$R'_fO$—$(CF(CF_3)CF_2O)_u$—, wherein: R'f is a $C_1$-$C_3$ bifunctional perfluoroalkyl radical; u is an integer of at least one;

—$(CFX_0O)_t$—$(CF_2CF(CF_3)O)_r$—$R'_fO$—$(CF_2CF(CF_3)O)_r$—$(CFX_0)_t$—; wherein: $R'_f$, r, t and $X_0$ are as above;

—$(CF_2(CF_2)_xCF_2O)_v$—, wherein: v is an integer of at least one, x is an integer equal to 1 or 2;

—$(CF_2CF_2CH_2O)_w$—$R'_fO$—$(CH_2CF_2CF_2O)_w$—, wherein: $R'_f$ is as above; w is an integer of at least one.

Typically p, q, r, s, t, u, v, w and x in the formulas above are selected so that the number average molecular weight of the (per)fluoropolyether radical $R_F$ is between 500 and 10,000, preferably between 800 and 5000.

In formula (I) $A_1$ and $A_2$, equal to or different from each other, are each independently selected from the group consisting of hydrogen; halogen; $C_1$-$C_{20}$ alkyl, preferably $C_1$-$C_{10}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; —$(R^1_2SiO)_bR^1$ wherein $R^1$ and b are as defined; aromatic or heteroaromatic radical, monocyclic or polycyclic, optionally substituted and/or optionally fluorinated and wherein $A_1$ and $A_2$ may optionally comprise a 1,5-enediyne moiety.

$A_1$ and $A_2$ may be comprised in an alkyl or aromatic cyclic structure, optionally substituted and/or optionally fluorinated, such as:

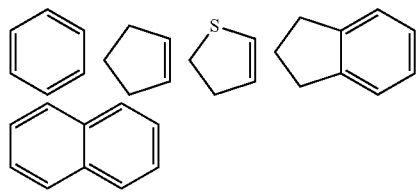

When $A_1$ and $A_2$ are part of an alkyl or, preferably, of an aromatic cyclic structure said structure may be substituted on any of the carbon atoms.

$A_1$ and $A_2$, equal to or different from each other, are preferably selected from the group consisting of hydrogen, fluorinated $C_1$-$C_{20}$ alkyl, preferably $C_1$-$C_{10}$ alkyl, linear or branched; (per)fluoropolyether chain; —$(R^1_2SiO)_bR^1$ wherein b and $R^1$ are as defined above; unsubstituted or substituted phenyl. More preferably at least one of $A_1$ and $A_2$ is a (per)fluoropolyether chain or —$(R^1_2SiO)_bR^1$ as above defined.

Alternatively $A_1$ and $A_2$ are part of an aromatic cyclic structure, preferably an aromatic cyclic structure having from 6 to 10 carbon atoms, more preferably an unsubstituted or substituted phenyl ring.

Representative examples of compounds of formula (I) include but are not limited to:

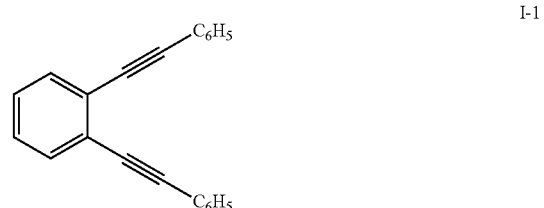
I-1

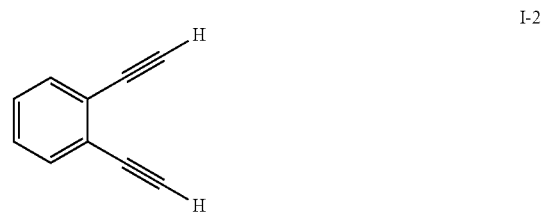
I-2

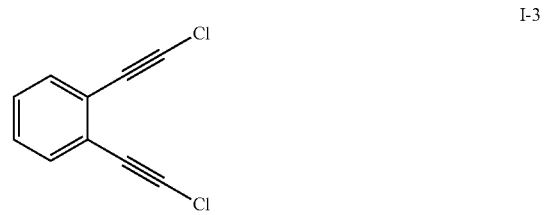
I-3

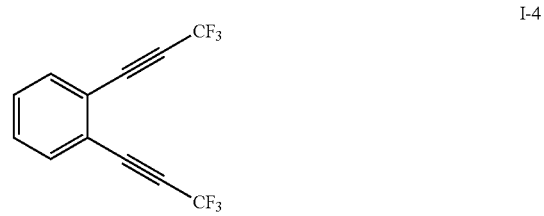
I-4

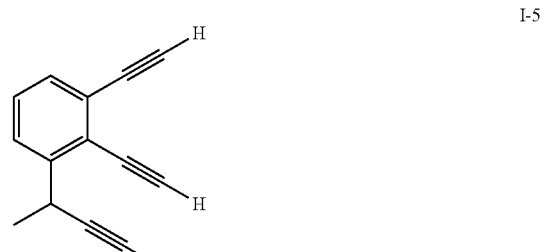
I-5

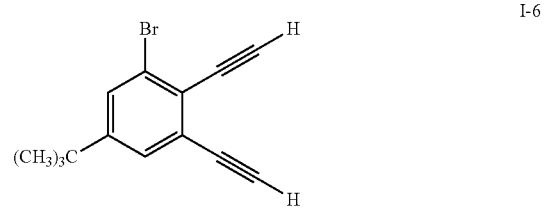
I-6

-continued

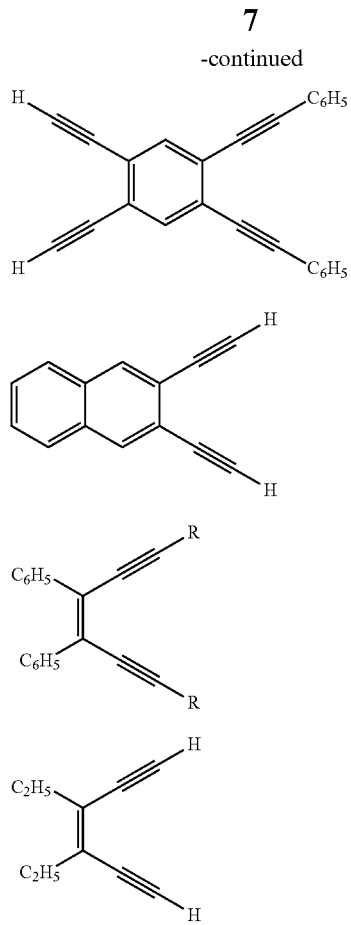

I-7

I-8

I-9

I-10

In an embodiment of the invention the curing agent is selected among the compounds of formula (I) represented by formula (II):

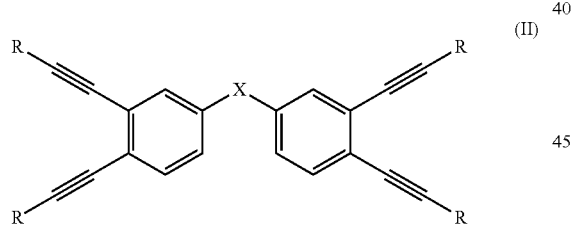

(II)

wherein each R in formula (II), equal to or different from each other, is as defined above.

X is a divalent bridging group selected from a carbon-carbon bond; a $C_1$-$C_{20}$ alkylene radical, optionally substituted (e.g. —C(CH$_3$)$_2$—) and/or optionally fluorinated (e.g. —(CF$_2$)$_n$—, —C(CF$_3$)$_2$—); a divalent (per)fluoropolyether radical $R_F$ as defined above; an organopolysiloxane radical —(R$^1{}_2$SiO)$_b$— wherein R$^1$ and b are as defined above; a —O— radical; a —S— radical; a —SO$_2$— radical; a —C(O)— radical; a fused aromatic or heteroaromatic structure optionally substituted and/or optionally fluorinated.

The divalent bridging group X may be preferably selected from carbon-carbon bond; a $C_1$-$C_{20}$ alkylene radical, optionally substituted, such as —C(CH$_3$)$_2$—; a $C_1$-$C_{20}$ fluorinated alkylene radical, optionally substituted; a divalent (per) fluoropolyether radical $R_F$; an organopolysiloxane radical —(R$^1{}_2$SiO)$_b$—; a fused aromatic or heteroaromatic structure optionally substituted and/or optionally fluorinated. More preferably X is selected from a $C_1$-$C_{20}$ fluorinated alkylene radical, optionally substituted or a divalent (per)fluoropolyether radical $R_F$ as above defined.

Suitable $C_1$-$C_{20}$ fluorinated alkylene radicals are for instance —C(CF$_3$)$_2$— or those of formula —(CF$_2$)$_n$— wherein n is an integer from 1 to 20, e.g. 2, 3, 4, 6, 8, 10, 12, 14, 16, 18, 20.

Representative examples of compounds of formula (II) include but are not limited to:

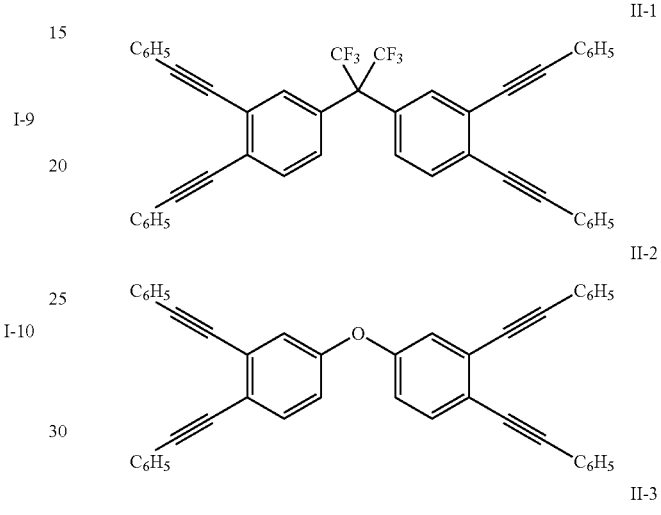

II-1

II-2

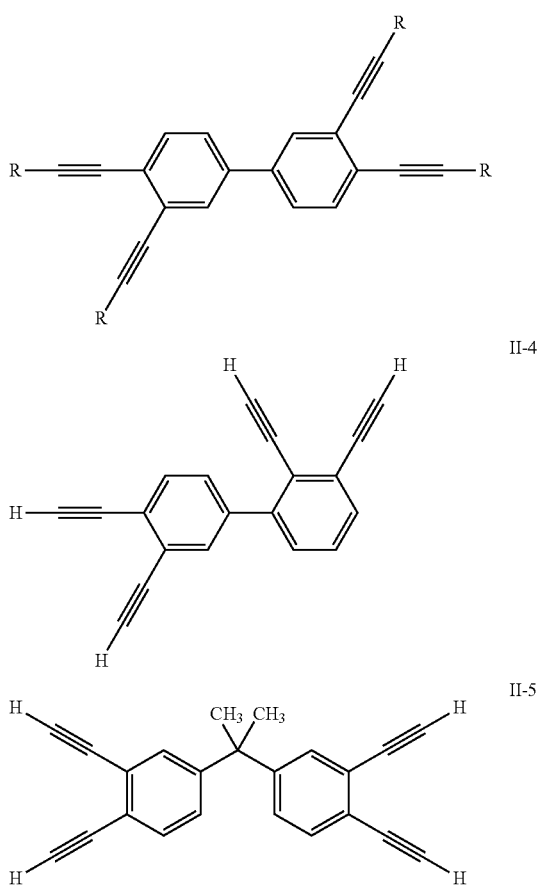

II-3

II-4

II-5

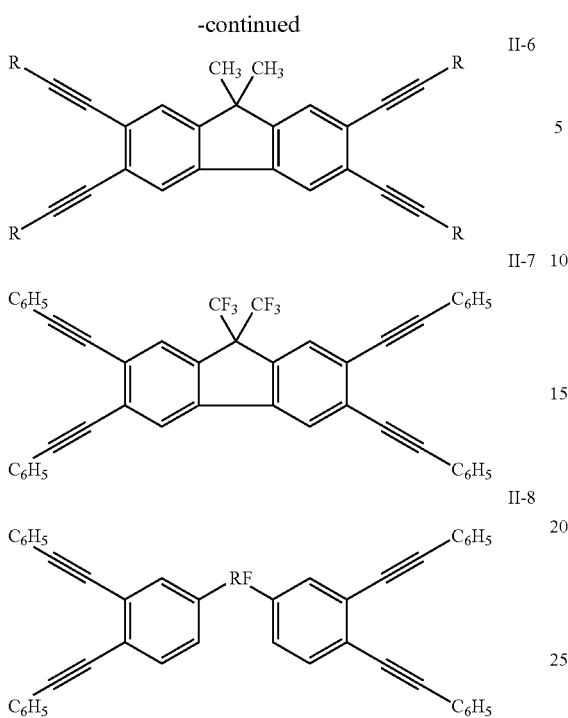

Compounds of formula (I) or (II) can be prepared according to known processes such as those described in Smith, D. W., Babb, D. A.; J. Am Chem. Soc. 120, n. 35, (1998) 9078-9079 or in Basak, A., Mandal, S., Bag, S. S.; Chemical Rev. 103, (2003) 4077-4094.

The amount of curing agent of formula (I) in the curable composition is advantageously of at least 0.1, preferably at least 0.5, more preferably at least 1 weight parts per hundred parts of polymer (P).

The amount of curing agent is advantageously at most 25, preferably at most 20, more preferably at most 15 weight parts per hundred parts of polymer (P).

The polymer (P) in the curable composition of the invention may be any polymer which is suitable to be cross-linked, preferably suitable to be cross-linked with a radical initiated mechanism.

Typically polymers that may be cross-linked by a radical route comprise cure sites in their back-bone, either provided by suitable functional groups present in recurring units from functional monomers incorporated in the polymer chain or provided by reactive end-group, e.g. formed by suitable chain transfer agents (e.g. halogen-containing cure-sites). Polymer (P) typically does not contain any 1,5-enediyne moiety.

Suitable polymers (P) may be hydrocarbon polymers or fluorocarbon polymers.

Notable examples of hydrocarbon polymers are for instance ethylene copolymers, ethylene/propylene/diene copolymers (e.g EPDM), styrene-butadiene copolymers, poly(butylene), chlorinated rubber, chlorinated ethylene polymers and copolymers, aromatic polymers comprising sulfone or sulfide bridging groups such as polyphenylenesulfide, polysulfone, polyethersulfone, polyphenylsulfone.

Preferably polymer (P) is a fluoropolymer. Suitable fluoropolymers are those comprising recurring units derived from at least one fluorinated monomer. Non limiting examples of suitable fluorinated monomers are:

$C_2$-$C_8$ fluoro- and/or perfluoroolefins, such as tetrafluoroethylene, hexafluoropropylene, pentafluoropropylene, and hexafluoroisobutylene;

$C_2$-$C_8$ hydrogenated fluoroolefins, such as vinyl fluoride, 1,2-difluoroethylene, vinylidene fluoride and trifluoroethylene;

(per)fluoroalkylethylenes of formula $CH_2=CH-R_{f0}$, wherein $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene;

fluoroalkylvinylethers of formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers of formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers of formula $CF_2=CFOX_1$, in which $X_1$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers of formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers of formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl, said $Y_0$ group having one or more ether groups and $Y_0$ comprising a carboxylic or sulfonic acid group, in its acid, acid halide or salt form;

fluorodioxoles, of formula:

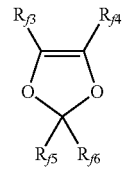

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

In addition to fluorinated monomers, polymer (P) may comprise hydrogenated monomers such as ethylene and propylene.

Should the fluoropolymer comprise recurring units derived from hydrogenated monomers, the amount of recurring units derived from the fluorinated monomers in the fluoropolymer would be of at least 75% wt, preferably of at least 90% wt, and more preferably of at least 97% wt.

In a first embodiment polymer (P) is a fluoroelastomer. The term "fluoroelastomer" is used herein to refer to amorphous polymers characterised by a heat of fusion, as determined according to ASTM D 3418-08, of less than 5 J/g, preferably of less than 4 J/g, more preferably of less than 1 J/g. Typically fluoroelastomers have a glass transition temperature ($T_g$) below room temperature, in most cases even below 0° C.

Suitable fluoroelastomers advantageously comprise recurring units derived from vinylidene fluoride and/or from tetrafluoroethylene. Preferably, the fluoroelastomer used in the curable composition of the invention consists of recurring units derived from vinylidene fluoride and/or from tetrafluoroethylene and at least one other fluorinated monomer, as above described. In particular suitable fluorinated monomers are selected from:

fluoroalkylvinylethers of formula $CF_2=CFOR_{f1}$, wherein $R_{f1}$ is a $C_1$-$C_6$ (per)fluoroalkyl, for example trifluoromethyl, bromotrifluoromethyl, penta-fluoropropyl, perfluoromethylvinylether, perfluoroethylvinylether, perfluoropropylvinylether;

fluoro-oxyalkylvinylethers of formula $CF_2=CFOX_0$, wherein $X_0$ is: a $C_1$-$C_{12}$ perfluorooxyalkyl, containing one or more ether groups, for example perfluoro-2-propoxy-propyl; in particular compounds having general formula:

$$CFX_2=CX_2OCF_2OR''_f$$

wherein $R''_f$ is selected from $C_2$-$C_6$ linear or branched (per)fluoroalkyl, $C_5$-$C_6$ cyclic (per)fluoroalkyl, $C_2$-$C_6$ linear or branched (per)fluorooxyalkyl containing from one to three oxygen atoms, and $X_2$ is hydrogen or fluorine, preferably selected from the following: $CF_2=CFOCF_2OCF_2CF_3$, $CF_2=CFOCF_2OCF_2CF_2OCF_3$, $CF_2=CFOCF_2OCF_3$.

The fluoroelastomer can optionally contain recurring units deriving from $C_3$-$C_8$ fluoroolefins, optionally containing hydrogen atoms, chlorine and/or bromine and/or iodine, $C_2$-$C_8$ non-fluorinated olefins, preferably ethylene and/or propylene.

Notable examples of suitable fluoroelastomers are for instance copolymers of vinylidene fluoride, hexafluoropropene, tetrafluoroethylene and perfluoroalkyl vinyl ethers; copolymers of vinylidene fluoride, perfluoroalkyl vinyl ether, and optionally tetrafluoroethylene; copolymers of vinylidene fluoride, $C_2$-$C_8$ non-fluorinated olefins, hexafluoropropylene and/or perfluoroalkyl vinyl ether and tetrafluoroethylene; copolymers comprising vinylidene fluoride and (per)fluoromethoxyvinyl ether and optionally perfluoroalkyl vinyl ether and tetrafluoroethylene; copolymers of tetrafluoroethylene and perfluoroalkyl vinyl ether.

In a second embodiment polymer (P) is a semi-crystalline fluoropolymer. The term "semi-crystalline fluoropolymer" is used herein to refer to fluoropolymers characterised by a heat of fusion, as determined according to ASTM D 3418-08, of at least 5 J/g. Suitable semi-crystalline fluoropolymers advantageously comprise recurring units derived from vinylidene fluoride, tetrafluoroethylene, chlorotrifluoroethylene, hexafluoropropylene and fluoroalkylvinylethers of formula $CF_2=CFOR_{f1}$ as discussed above.

Notable examples of suitable semi-crystalline copolymers are for instance copolymers of tetrafluoroethylene and hexafluoropropylene, copolymers of tetrafluoroethylene and perfluoromethylvinylether, copolymers of vinylidene fluoride and chlorotrifluoroethylene, copolymers of ethylene and chlorotrifluoroethylene, terpolymers of tetrafluoroethylene, hexafluoropropylene and vinylidene fluoride, poly(vinylidene fluoride).

Fluoropolymers may optionally comprise recurring units derived from bis-olefins. Non limiting examples of suitable bis-olefins are selected form those of formulas below:

$R_1R_2C=CH-(CF_2)_j-CH=CR_3R_4$ wherein j is an integer between 2 and 10, preferably between 4 and 8, and $R_1$, $R_2$, $R_3$, $R_4$, equal or different from each other, are hydrogen, fluorine or $C_1$-$C_5$ alkyl or (per)fluoroalkyl group;

$D_2C=CB-O-E-O-CB=CD_2$, wherein each of D, equal or different from each other, is independently selected from hydrogen, fluorine, chlorine; each of B, equal or different from each other is independently selected from hydrogen, fluorine, chlorine and $-OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a $-(CF_2)_m-$ group, with m being an integer from 3 to 5; a preferred bis-olefin is $F_2C=CF-O-(CF_2)_5-O-CF=CF_2$;

$R_6R_7C=CR_5-E-O-CB=CD_2$, wherein E, D and B have the same meaning as above defined; $R_5$, $R_6$, $R_7$, equal or different from each other, are hydrogen, fluorine or $C_1$-$C_5$ alkyl or (per)fluoroalkyl group.

When a bis-olefin is employed the resulting polymer will typically comprise from 0.01% to 5% by moles of units deriving from the bis-olefin with respect to the total amount of units in the polymer.

Fluoropolymers suitable for the curable composition of the invention generally include cure sites in the backbone, which enable curing of the fluoropolymer.

Fluoropolymers may comprise recurring units derived from cure-site monomers. The cure site monomer can be partially or fully fluorinated. Suitable cure site monomers are for instance perfluoro(vinyl ether) monomers comprising terminal cyano or perfluorophenyl groups or, preferably, fluorinated monomers containing a halogen other than fluorine. Such a halogen may be present along the fluoropolymer chain and/or in a terminal position. Typically the halogen is bromine or iodine. Copolymerization is preferred to introduce the halogen in a position along a fluoropolymer chain. In this route, fluorinated monomers as discussed above are combined with a suitable fluorinated cure site monomer. Examples of suitable halo-fluoroolefins include: chlorotrifluoroethylene, bromodifluoroethylene, bromotrifluoroethylene, iodotrifluoroethylene, 1-bromo-2,2-difluoroethylene, and 4-bromo-3,3,4,4-tetrafluorobutene-1,1-iodo-2,2-difluoroethylene, iodo-3,3,4,4-tetrafluorobutene-1,4-iodo-perfluorobutene-1 and the like.

Examples of bromo- or iodo-fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, $ICF_2OCF=CF_2$, $ICF_2CF_2OCF=CF_2$, $ICF_2CF_2CFOCF=CF_2$, $CF_3CFICF_2OCF=CF_2$, and the like. In addition, non-fluorinated halo-olefins, e.g., vinyl chloride, vinyl bromide and 4-bromo-1-butene, can be used. The amount of cure site monomer in a fluoropolymer is typically from 0.05 to 5% by moles, preferably from 0.1 to 2% by moles.

Cure sites may also occur in the terminal position of a fluoropolymer chain. Chain transfer agents or initiators are used to introduce the cure site in a terminal position. Generally, a suitable chain transfer agent is introduced in the reaction medium during polymer preparation, or is derived from a suitable initiator.

Examples of useful chain transfer agents include those having the formula $R_{f7}Z_d$ wherein $R_{f7}$ is a substituted or unsubstituted $C_1$-$C_{12}$ fluoroalkyl radical, which may be perfluorinated, Z is Cl, Br or I, and d is 1 or 2. Specific examples include: $CF_2Br_2$, $Br(CF_2)_2Br$, $Br(CF_2)_4Br$, $CF_2(Cl)Br$, $CF_3CF(Br)CF_2Br$, $CF_2I_2$, $I(CF_2)_6I$, $I(CF_2)_4I$, $CF_2Cl_2$, $CF_3CFICF_2I$. Other suitable chain transfer agents are, for example, alkaline or alkaline-earth metal iodides and/or bromides. The amount of a cure site component in a terminal position is generally from 0.05 to 5% by moles, preferably from 0.1 to 2% by moles.

The curable composition of the invention may comprise in addition to at least one polymer (P) and at least one curing agent of formula (I) or (II) additional components as known in the art, such as reinforcing fillers, thickeners, pigments, lubricants, antioxidants, stabilizers, processing aids and the like.

The curable composition may comprise additives capable to improve the dispersion of the curing agent of formula (I) or (II) into polymer (P). The nature of the additive will be typically selected on the basis of the nature of polymer (P). Should polymer (P) be a fluoropolymer suitable dispersing additives may be compounds comprising a (per)fluoropolyether chain said chain comprising either aromatic pendant groups and/or aromatic terminal groups, said aromatic groups being optionally fluorinated. Suitable (per)fluoropolyether chains may be represented by formula $T-O_z—R_F—O_z-T$ wherein T, $R_F$ and z are as detailed above with the proviso that either T and/or $R_F$ comprise aromatic groups, preferably benzene groups, optionally fluorinated.

The curable composition of the invention may comprise catalysts that promote the dimerization reaction of the ethynyl groups in the curing agent of formula (I) or (II). Suitable catalysts may be selected among late transition metals and late transition metal compounds, preferably among Cu, Ni, Pd, Pt, Ru, Rh metals and their compounds. The metals may be optionally supported, e.g. on supports such as carbon black, graphite. The amount of catalyst is generally from 0.01 to 5% by weight of the metal or metal compound with respect to the weight of the curing agent in the curable composition, preferably from 0.1 to 5% by weight.

Another object of the invention is a process for the manufacture of a curable composition comprising mixing:
 (a) at least one polymer (P); and
 (b) at least one curing agent of formula (I).

Mixing can be carried out by means of any mixing apparatus known to be useful for preparing polymer compositions, including a roller-type rubber mill, a Banbury mixer, a twin-screw extruder and the like. Mixing can also be accomplished in solution, by dissolving the polymer (P) and the curing agent in appropriate solvents, optionally followed by precipitation and/or drying. The temperature of the mixture during the mixing process is typically kept below the curing temperature of the composition. Alternatively, the temperature during the mixing process may be such to initiate the curing process in a so-called reactive mixing process.

A further object of the invention is a process for making a cured article from a curable composition comprising at least one polymer (P) and at least one curing agent of formula (I). Said process typically comprises preparing a curable composition by mixing at least one polymer (P) and at least one curing agent of formula (I), as described above, and curing said composition. Generally, the process comprises the additional step of shaping the composition before curing.

The curable composition is typically processed and shaped, for instance by extrusion (e.g., into the shape of a film, tube, or hose), by molding (e.g., in the form of sheet or an O-ring) or by casting from a solution (e.g. in the form of a film or a coating). The shaped article can then be heated to cure the polymer composition and form a cured article.

Thus, another object of the invention is a process for the curing of a curable composition comprising heating a composition comprising:
 at least one polymer (P); and
 at least one curing agent of formula (I).

Curing can be advantageously effected by heating the curable composition of the invention at a temperature above the temperature of dimerization of the ethynyl moiety in the curing agent. One skilled in the art will realize that the curing temperature for a particular curing agent will depend on the nature and position of substituents R and $A_1$ and $A_2$ in formulas (I) and (II) as well as on the nature of polymer (P). The curing temperature may additionally be dependent on the presence of a catalyst as above described.

Molding or press curing of the curable composition usually is conducted at a temperature sufficient to cure the composition in a desired time.

Typical temperatures for the dimerization of the ethynyl moiety in the curing agent, are from 50° C. to 380° C., more typically from 100° C. to 350° C.

Heating can be applied for a period of from 1 minute to 48 hours, typically from 5 minutes to 60 minutes.

Conventional presses, molds, extruders and the like, provided with suitable heating and curing means can be used to obtain a cured polymer article.

When maximum heat resistance and dimensional stability are required, the curing process may advantageously comprise a post-curing operation wherein the cured polymer article is heated in a oven, e.g. an air-circulating oven, for an additional period of about 1-48 hours and at a temperature of from 200 to 300° C.

A further object of the present invention is a cured article obtained by the curing of the curable composition of the invention. The cured article comprises cross-links which are derived from the dimerization of the ethynyl moieties in the curing agent. The cross-links typically create a three-dimensional network among the polymer chains deriving from polymer (P).

The present invention will now be described in more details by reference to the following examples, whose purposes are merely illustrative and do not limit the scope of the invention.

Should the disclosure of any of the patents, patent applications, and publications that are incorporated herein by reference conflict with the present description to the extent that it might render a term unclear, the present description shall take precedence.

Raw Materials

Curing agent: curing agent of formula (II-1), hereinafter referred to as BODA, was prepared following the general procedure described in Smith, D. W., Babb, D. A.; J. Am Chem. Soc. 120, n. 35, (1998) 9078-9079.

TECNOFLON® PFR06HC is a linear tetrafluoroethylene/perfluoro(methyl vinylether)fluoroelastomer with iodine cure sites in terminal position commercially available from Solvay Solexis SpA.

TECNOFLON® PFR 94 is a branched tetrafluoroethylene/perfluoro(methyl vinylether)fluoroelastomer with iodine cure sites in terminal position commercially available from Solvay Solexis SpA.

SOLEF® 32008 is a semi-crystalline copolymer of vinylidene fluoride and chlorotrifluoroethylene, commercially available from Solvay Solexis SpA.

Carbon black N990 is commercially available from CAN-CARB Ltd.

Characterization

Determination of Storage Modulus (Torsional Pendulum)

Determination of the storage modulus (G') of cured items (torsional pendulum) was carried out according to method ISO 6721-10 using an ARES rheometer in torsional rectangular mode (ISO 6721-7) using a rectangular bar (10 mm wide, 45 mm long) cut from a 1.5 mm thick film. A heating ramp of 2° C./minute from 30 to 300° C. was applied. The oscillation frequency was 1 Hz.

General Procedure for Curing Evaluation (Parallel Plate Geometry)

The curing efficiency of the curable compositions was tested using a non isothermal test. A 25 mm disc was placed between two parallel plates in an ARES rheometer. The disc was heated to 150° C. and equilibrated for 5 minutes. Then a heating ramp of 1° C./min was applied and the storage modulus (G') was measured at a frequency of 1 rad/sec. The test terminated after reaching a temperature of 300° C. The formation of cross-links was evaluated from the ratio of the storage moduli at 300° C. of compositions with the curing agent with respect to the reference sample not containing the curing agent.

Examples 1-3

Preparation of Compositions Comprising Tecnoflon® PFR 06HC and BODA from Solution and their Curing Behaviour 10 grams of Tecnoflon® PFR 06HC were dissolved in 200 grams of perfluoroheptane. 0.1 grams of BODA (1 weight part per hundred parts of polymer, phr) were dissolved in a solvent mixture containing 5 grams of acetone and 15 grams of pentane. The two solutions were poured in a funnel equipped with mechanical stirring. The stirring speed was set in order to have a homogeneous emulsification of the liquid medium. The emulsion was slowly dropped on a metal hot surface kept at a temperature above 80° C. in order to quickly evaporate the solvents and to form a homogeneous BODA and polymer mixture. The mixture was finally dried at room temperature under vacuum for 7 hours.

The mixture was then formed in a film shape having a thickness about 1.5 mm by compression molding at 80° C. A disc was cut from the film and tested according to the general curing procedure reported above.

Compositions comprising 0.3 g (3 phr) and 2 g (20 phr) of BODA in Tecnoflon® PFR06HC (Examples 2 and 3, respectively) were prepared and tested following the same procedure.

Pure Tecnoflon® PFR 06HC was prepared and tested as in Example 1.

The storage modulus as a function of temperature is reported in FIG. 1. The value of storage modulus at 300° C. for each sample, for the reference sample as well as their respective ratios are reported in Table 1.

TABLE 1

| Sample | Storage modulus (Pa) | Ratio |
|---|---|---|
| Tecnoflon ® PFR06HC | 56 | — |
| Example 1 | 28,325 | 506 |
| Example 2 | 59,330 | 1060 |
| Example 3 | 84,545 | 1510 |

Examples 4-6

General Preparation of Compositions Comprising Tecnoflon® PFR 94, Carbon Black N990 and BODA in an Open Mill and their Curing Behaviour 20 g of N990 carbon black (20 phr) and 1 g of BODA (1 phr) in powder form were mixed with 100 grams of Tecnoflon® PFR 94 in an open mill with rolls cooled at 19° C. 10 grams of this compound were then formed in a film shape having a thickness about 1.5 mm by compression molding at 80° C. A disc was cut from the film and storage modulus was measured as a function of temperature.

Compositions comprising 3 g (3 phr) and 5 g (5 phr) of BODA in Tecnoflon® PFR 94 and carbon black N990 (Examples 5 and 6, respectively) were prepared and tested following the same procedure.

A composition comprising Tecnoflon® PFR 94 and 20 phr of carbon black N990 was prepared and tested as in Example 4.

The value of storage modulus at 300° C. for each sample, for the reference sample as well as their respective ratios are reported in Table 2.

TABLE 2

| Sample | Storage modulus (Pa) | Ratio |
|---|---|---|
| Tecnoflon ® PFR94 + 20 phr N990 | 1250 | — |
| Example 4 | 104,000 | 83 |
| Example 5 | 162,000 | 130 |
| Example 6 | 341,000 | 273 |

Example 7

Preparation and Curing Behaviour of Compositions Comprising SOLEF® 32008 and BODA 10 grams of SOLEF® 32008 were dissolved in 200 grams of acetone. 0.3 grams of BODA (3 phr) were dissolved in 3 grams of acetone. The two solutions were mixed together and acetone was removed in a rotary evaporator at 80° C. The SOLEF®/BODA mixture was finally dried at room temperature under vacuum for 7 hours. The mixture was then formed in a film shape having a thickness of about 1.5 mm by compression molding at 180° C. The film was then cured in a press at 260° C. for 3 hours. It was possible to heat a rectangular bar for torsional pendulum analysis in vertical position without any dripping up to 360° C.

The item prepared with this procedure had a storage modulus G' at 250° C. of 0.5 MPa, evaluated according to the general parallel plate procedure described above.

Comparative Example 1

A rectangular bar 10 mm wide and 45 mm long was cut from a 1.5 mm thick film made of pure SOLEF® 32008 prepared by compression molding at 180° C. The bar was cured in a press at 260° C. for 3 hours. Upon heating the specimen in vertical position, it started dripping above the melting point (160° C.). No measurement of elastic modulus G' according to the general torsional pendulum procedure was possible above 180° C. because of the dripping of the sample. At 250° C. a storage modulus below 1 kPa was measured according to the general parallel plate procedure described above.

The invention claimed is:

1. A curable composition comprising:

(a) at least one fluorinated polymer (P) comprising cure sites in the backbone, either in the polymer chain or in one or more end groups; and (b) at least one curing agent of formula (II):

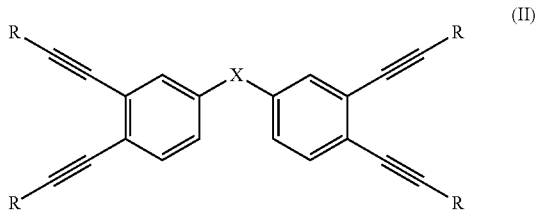

wherein each R, equal to or different from each other, is independently selected from the group consisting of hydrogen; halogen; $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; —$SiR^1_3$, —$(R^1_2SiO)_bR^1$, —$PR^1_2$ wherein each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1; wherein X is a divalent bridging group selected from the group consisting of a carbon-carbon bond; a $C_1$-$C_{20}$ alkylene radical, optionally substituted and/or optionally fluorinated; a divalent (per)fluoropolyether radical; an organopolysiloxane radical —$(R^1_2SiO)_b$—; a —O— radical; a —S— radical; a —$SO_2$— radical; a —C(O)— radical; a fused aromatic or heteroaromatic structure optionally substituted and/or optionally fluorinated; and wherein the curable composition is a dry curable composition.

2. The composition according to claim 1 wherein X is selected from the group consisting of a carbon-carbon bond; a fluorinated $C_1$-$C_{20}$ alkylene radical, optionally substituted; a divalent (per)fluoropolyether radical; an organopolysiloxane radical —$(R^1_2SiO)_b$— wherein $R^1$ and b are as defined in claim 1.

3. The composition according to claim 1 wherein each R, equal to or different from each other, is independently selected from the group consisting of hydrogen; halogen; $C_1$-$C_8$ alkyl, linear or branched, optionally substituted and/or optionally fluorinated; $C_1$-$C_3$ oxyalkyl, linear or branched, optionally substituted and/or optionally fluorinated; (per)fluoropolyether chain; —$(R^1_2SiO)_bR^1$ wherein b and $R^1$ are as defined in claim 1; aromatic or heteroaromatic radical, monocyclic or polycyclic, optionally substituted and/or optionally fluorinated.

4. A process for the manufacture of the curable composition of claim 1 comprising mixing said at least one polymer (P) with said at least one curing agent of formula (II); and removing solvent, if present.

5. A process for curing a curable composition comprising heating a composition of claim 1.

6. A process of making a cured article comprising: shaping the curable composition of claim 1 to form a shaped composition; curing the shaped composition to form an article; and optionally post curing the article.

7. A cured article obtainable form the composition of claim 1, wherein the cured article comprises cross-links derived from dimerization of ethynyl moieties in the curing agent.

8. The composition according to claim 1, wherein X is selected from an optionally substituted $C_1$-$C_{20}$ fluorinated alkylene radical or a divalent (per)fluoropolyether radical.

9. The composition according to claim 1, wherein polymer (P) is a fluoropolymer comprising recurring units derived from at least one fluorinated monomer selected from:

$C_2$-$C_8$ fluoro- and/or perfluoroolefins;
$C_2$-$C_8$ hydrogenated fluoroolefins;
(per)fluoroalkylethylenes of formula $CH_2$=CH—$R_{f0}$ wherein $R_{f0}$ is a $C_1$-$C_6$ (per)fluoroalkyl or a $C_1$-$C_6$ (per)fluorooxyalkyl having one or more ether groups;
chloro-$C_2$-$C_6$ fluoroolefins; bromo-$C_2$-$C_6$ fluoroolefins; iodo-$C_2$-$C_6$ fluoroolefins;
fluoroalkylvinylethers of formula $CF_2$=$CFOR_{f1}$ wherein $R_{f1}$ is a $C_1$-$C_6$ fluoro- or perfluoroalkyl;
hydrofluoroalkylvinylethers of formula $CH_2$=$CFOR_{f1}$ wherein $R_{f1}$ is a $C_1$-$C_6$ fluoro- or perfluoroalkyl;
fluoro-oxyalkylvinylethers of formula $CF_2$=$CFOX_1$, wherein $X_1$ is a $C_1$-$C_{12}$ oxyalkyl or $C_1$-$C_{12}$ (per)fluorooxyalkyl having one or more ether groups;
fluoroalkyl-methoxy-vinylethers of formula $CF_2$=$CFOCF_2OR_{f2}$ wherein $R_{f2}$ is a $C_1$-$C_6$ fluoro- or perfluoroalkyl, or a $C_1$-$C_6$ (per)fluorooxyalkyl having one or more ether groups;
functional fluoro-alkylvinylethers of formula $CF_2$=$CFOY_0$ wherein $Y_0$ is a $C_1$-$C_{12}$ alkyl or (per)fluoroalkyl, a $C_1$-$C_{12}$ oxyalkyl, or a $C_1$-$C_{12}$ (per)fluorooxyalkyl, and wherein $Y_0$ comprises one or more ether groups and a carboxylic or sulfonic acid group, in its acid, acid halide or salt form;
fluorodioxoles of formula:

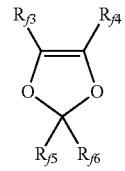

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom.

10. The composition according to claim 1, wherein polymer (P) is a fluoroelastomer.

11. The composition according to claim 1, wherein polymer (P) is a semi-crystalline fluoropolymer.

12. The composition according to claim 9, wherein polymer (P) is a fluoropolymer comprising recurring units derived from at least one fluorinated monomer selected from:

tetrafluoroethylene; hexafluoropropylene; pentafluoropropylene;
hexafluoroisobutylene; vinyl fluoride; 1,2-difluoroethylene; vinylidene fluoride;
trifluoroethylene; chlorotrifluoroethylene; fluoroalkylvinylethers of formula $CF_2$=$CFOR_{f1}$ in which $R_{f1}$ is selected from —$CF_3$, —$C_2F_5$, and —$C_3F_7$; hydrofluoroalkylvinylethers of formula $CH_2$=$CFOR_{f1}$ in which $R_{f1}$ is selected from —$CF_3$, —$C_2F_5$, and —$C_3F_7$;
fluoro-oxyalkylvinylether of formula $CF_2$=$CFOX_1$ in which $X_1$ is perfluoro-2-propoxy-propyl;

fluoroalkyl-methoxy-vinylethers of formula $CF_2=CFOCF_2OR_{f2}$ in which $R_{f2}$ is selected from $—CF_3$, $—C_2F_5$, $—C_3F_7$ and $—C_2F_5—O—CF_3$; fluorodioxoles of formula:

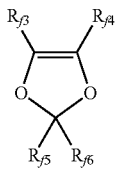

wherein each of $R_{f3}$, $R_{f4}$, $R_{f5}$, $R_{f6}$, equal or different each other, is independently selected from a fluorine atom, $—CF_3$, $—C_2F_5$, $—C_3F_7$, $—OCF_3$, and $—OCF_2CF_2OCF_3$.

13. The composition according to claim 1, wherein polymer (P) does not contain any 1,5-enediyne moiety.

14. A curable composition comprising:
(a) at least one fluorinated polymer (P), wherein polymer (P) is a fluoroelastomer; and
(b) at least one curing agent of formula (II):

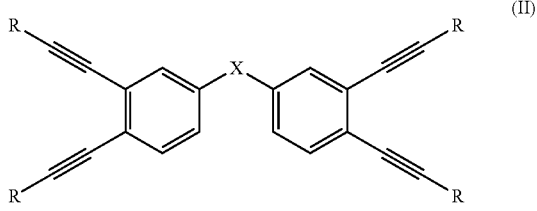

wherein each R, equal to or different from each other, is independently selected from the group consisting of hydrogen; halogen; $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; $—SiR^1_3$, $—(R^1_2SiO)_bR^1$, $—PR^1_2$ wherein each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1; wherein X is a divalent bridging group selected from the group consisting of a carbon-carbon bond; a $C_1$-$C_{20}$ alkylene radical, optionally substituted and/or optionally fluorinated; a divalent (per)fluoropolyether radical; an organopolysiloxane radical $—(R^1_2SiO)_b—$; a $—O—$ radical; a $—S—$ radical; a $—SO_2—$ radical; a $—C(O)—$ radical; a fused aromatic or heteroaromatic structure optionally substituted and/or optionally fluorinated; and wherein the curable composition is a dry curable composition.

15. The composition according to claim 14 wherein X is selected from the group consisting of a carbon-carbon bond; a fluorinated $C_1$-$C_{20}$ alkylene radical, optionally substituted; a divalent (per)fluoropolyether radical; an organopolysiloxane radical $—(R^1_2SiO)_b—$ wherein $R^1$ and b are as defined in claim 14.

16. The composition according to claim 14 wherein each R, equal to or different from each other, is independently selected from the group consisting of hydrogen; halogen; $C_1$-$C_8$ alkyl, linear or branched, optionally substituted and/or optionally fluorinated; $C_1$-$C_3$ oxyalkyl, linear or branched, optionally substituted and/or optionally fluorinated;

(per)fluoropolyether chain; $—(R^1_2SiO)_bR^1$ wherein b and $R^1$ are as defined in claim 14; aromatic or heteroaromatic radical, monocyclic or polycyclic, optionally substituted and/or optionally fluorinated.

17. A process for the manufacture of the curable composition of claim 14 comprising mixing said at least one polymer (P) with said at least one curing agent of formula (II);

and removing solvent, if present.

18. A process for curing a curable composition comprising heating a composition of claim 14.

19. A process of making a cured article comprising: shaping the curable composition of claim 14 to form a shaped composition; curing the shaped composition to form an article; and optionally post curing the article.

20. A cured article obtainable form the composition of claim 14, wherein the cured article comprises cross-links derived from dimerization of ethynyl moieties in the curing agent.

* * * * *